US012188218B2

(12) United States Patent
Hutchings et al.

(10) Patent No.: US 12,188,218 B2
(45) Date of Patent: Jan. 7, 2025

(54) SEWER CLEANING SYSTEM WITH WATER TREATMENT SYSTEM

(71) Applicant: Hi-Vac Corp, Marietta, OH (US)

(72) Inventors: Todd Hutchings, Lowell, OH (US); Robert A. Courtwright, Jr., Marietta, OH (US); Daniel J. Coley, Cuyahoga Falls, OH (US)

(73) Assignee: Hi-Vac Corp., Marietta, OH (US)

( * ) Notice: Subject to any disclaimer, the term of this patent is extended or adjusted under 35 U.S.C. 154(b) by 336 days.

(21) Appl. No.: 17/745,928

(22) Filed: May 17, 2022

(65) Prior Publication Data

US 2022/0372747 A1    Nov. 24, 2022

Related U.S. Application Data

(60) Provisional application No. 63/190,417, filed on May 19, 2021.

(51) Int. Cl.
| | | |
|---|---|---|
| *E03F 7/10* | (2006.01) | |
| *E03F 9/00* | (2006.01) | |
| *B01D 36/04* | (2006.01) | |
| *B08B 9/00* | (2006.01) | |

(52) U.S. Cl.
CPC ............... *E03F 7/10* (2013.01); *E03F 9/007* (2013.01); *B01D 36/045* (2013.01); *B08B 9/00* (2013.01)

(58) Field of Classification Search
CPC ....... E03F 9/007; B08B 9/035; B01D 36/045; B01D 29/56; A47L 7/0071; C02F 1/004
See application file for complete search history.

(56) References Cited

U.S. PATENT DOCUMENTS

| | | | | |
|---|---|---|---|---|
| 4,134,174 A | * | 1/1979 | Flynn | ........................ E03F 7/10 |
| | | | | 15/352 |
| 4,211,650 A | | 7/1980 | Thomas | |
| 4,211,651 A | | 7/1980 | Thomas | |
| 4,211,652 A | | 7/1980 | Thomas | |
| 4,363,733 A | | 12/1982 | Meiller et al. | |
| 5,979,012 A | * | 11/1999 | Fritz | ...................... B08B 3/026 |
| | | | | 210/205 |
| 8,617,400 B2 | | 12/2013 | Sauvignet et al. | |
| 9,861,914 B1 | * | 1/2018 | Bischel | ................ B60P 3/2245 |

(Continued)

FOREIGN PATENT DOCUMENTS

WO    WO-2015158783 A1 * 10/2015 ............... B01D 1/16

*Primary Examiner* — Michael D Jennings
(74) *Attorney, Agent, or Firm* — Wood Herron & Evans LLP

(57) ABSTRACT

A sewer cleaning system includes a water tank, a pump operatively coupled to the water tank, a water hose operatively coupled to the pump, a vacuum-generating system, a vacuum hose operatively coupled to the vacuum-generating system, and a debris tank having a forward bulkhead defining a fluid chamber. The bulkhead includes a debris sieve configured to allow water in the debris tank to flow through to the fluid chamber while retaining particulates in the debris tank. The sewer cleaning system further includes an extraction pump in fluid communication with the fluid chamber and configured to extract the water in the fluid chamber. The extraction pump is in fluid communication with the water tank so as to send the extraction water from the fluid chamber to the water tank for re-use. A method for cleaning a sewer line is also disclosed.

24 Claims, 7 Drawing Sheets

(56) References Cited

U.S. PATENT DOCUMENTS

| | | | |
|---|---|---|---|
| 2006/0086010 A1 | 4/2006 | Jarnecke et al. | |
| 2008/0276406 A1* | 11/2008 | Davis | E03F 7/10 15/301 |
| 2010/0047047 A1* | 2/2010 | Mayer | E03F 7/10 414/539 |
| 2010/0147753 A1* | 6/2010 | Baziuk | E03F 7/10 210/126 |
| 2013/0192645 A1* | 8/2013 | Polston | E03F 7/10 134/21 |
| 2014/0196246 A1* | 7/2014 | Hetcher | E03F 7/10 15/340.1 |
| 2015/0196182 A1* | 7/2015 | Hekman | A47L 11/4088 210/97 |
| 2016/0311624 A1* | 10/2016 | Wiedemann | B65G 33/08 |
| 2017/0159279 A1* | 6/2017 | Hetcher | B08B 9/035 |
| 2018/0148362 A1* | 5/2018 | Cappellotto | B01D 21/01 |
| 2019/0063978 A1* | 2/2019 | Brodbeck | E03F 7/10 |
| 2020/0149245 A1 | 5/2020 | Strobel et al. | |
| 2020/0149246 A1 | 5/2020 | Strobel et al. | |

\* cited by examiner

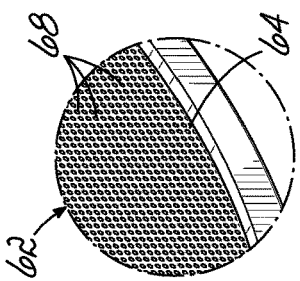
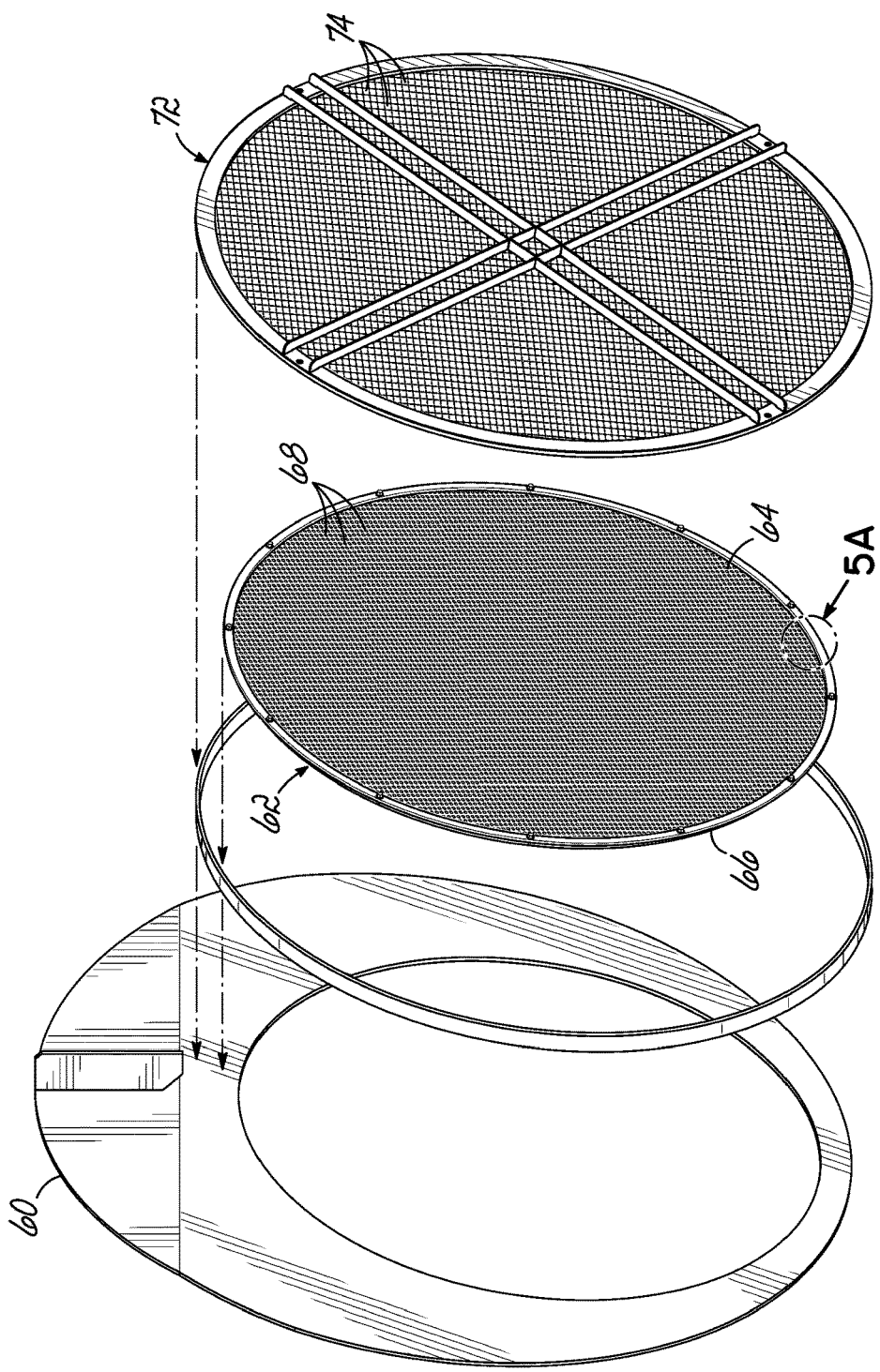

SEWER CLEANING SYSTEM WITH WATER TREATMENT SYSTEM

CROSS REFERENCE TO RELATED APPLICATION

This application claims the benefit of priority to U.S. Provisional Patent Application Ser. No. 63/190,417, filed May 19, 2021, the disclosure of which is incorporated by reference herein in its entirety.

TECHNICAL FIELD

The invention relates generally to sewer cleaning systems and, more particularly, to sewer cleaning systems with an onboard water reclamation system.

BACKGROUND

Underground sanitary and storm sewer lines need to be cleaned periodically. One way to clean the sanitary and storm sewer lines is to use a water-jet/vacuum system. A truck may be configured to operate as a water-jet/vacuum system. Such a truck is sometimes referred to as a jet/vac truck. As the name suggests, the truck includes a high-pressure water jet nozzle connected via a hose to a high-pressure water pump, which is supplied water from one or more water tanks. At the job site, typically at a manhole in the street, the water jet nozzle is lowered into a vertical access shaft until a horizontal run of sewer line is reached. The water jet nozzle is then guided into that sewer line. The jet/vac truck also includes a high capacity vacuum system. After the water jet nozzle is guided into the sewer line, a vacuum hose is lowered into the vertical access shaft which may have a well/basin where the shaft connects to the sewer line.

Using an above-ground controller, an operator activates the high-pressure pump which sends high-pressure water to the water jet nozzle. The water jet nozzle is designed such that the high-pressure water exiting the nozzle propels the nozzle further into the sewer line, while at the same time the high-pressure water acts to clear the sewer line and knock debris from the walls of the sewer line. After the nozzle progresses a certain distance along the sewer line, the hose connected to the nozzle is drawn back towards the jet/vac truck. As it is drawn back, the high-pressure water pushes the loosened debris back towards and into the well/basin where the vacuum hose draws the mixture of water and debris out of the well/basin and into a debris tank on the jet/vac truck. When the debris tank is full, the jet/vac truck must be driven to a dump site where the debris tank is emptied.

The cleaning process continues until the particular sewer line is clean or until the jet/vac truck is depleted of water to supply to the jet nozzle. When the length of a sewer line is not fully cleaned and the truck is depleted of water, the tanks on the truck must be replenished before the cleaning process may continue. If a source of water is not located at the job site (e.g., a fire hydrant), the truck may need to leave the job site and drive to a source of water to refill the tank. The process of leaving the job site to refill the water tank and/or to empty the debris tank adds a substantial amount of time required to complete the job of cleaning the particular sewer line.

A typical truck may carry anywhere between around 550 gallons to around 1,800 gallons of water. During the course of a day, a jet/vac truck may consume several thousand gallons of water. Those several thousand gallons of water are mixed with the debris from the sewer line, vacuumed up and emptied into the debris tank, and then that "dirty" water is dumped. Generally, the debris tank is filled with a large percentage of water compared to the amount of actual debris from the sewer line. In other words, when the debris tank is emptied, the contents are largely water. Thus, over the course of the day, a jet/vac truck will on-board several thousand gallons of clean water and then, once used, dump that water now combined with the debris from the sewer. In the end, a lot of clean water is consumed over the course of cleaning a sewer line.

What is needed, therefore, is a sewer cleaning system that uses less clean water during the sewer line cleaning process and allows the system to remain at the job site longer without having to replenish the clean water tanks with fresh clean water.

SUMMARY

Summary to be completed once the claims are finalized.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 5 is a disassembled perspective view of the bulkhead, the debris sieve, and the mesh/grate of the sewer cleaning system of FIG. 1.

FIG. 5A is an enlarged section of the debris sieve of FIG. 5 showing the through holes therein.

DETAILED DESCRIPTION OF THE INVENTION

Figure 1:
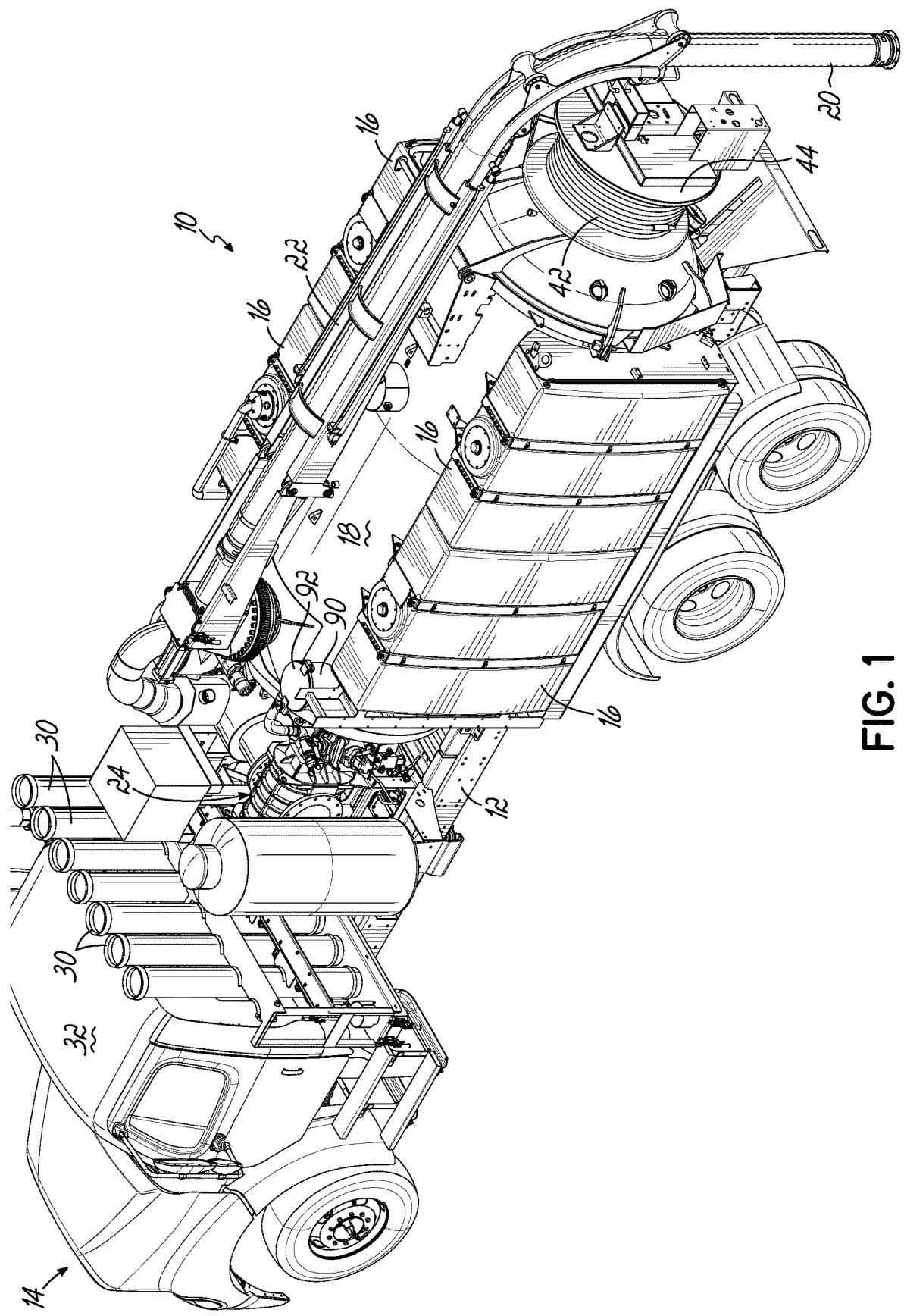
FIG. 1 is a rear perspective view of a sewer cleaning system according to an embodiment of the invention mounted to a truck.

As depicted in FIG. 1, a sewer cleaning system 10 according to one embodiment of the invention is mounted to a frame 12 of a truck 14. The combination of a sewer cleaning system mounted on the frame of a truck is sometimes referred to as a jet/vac truck. In general, the sewer cleaning system 10 illustrated and described herein recycles/reclaims water used during the sewer cleaning process so that less "clean water" (defined as fresh water carried to the jobsite in tanks by the truck or provided from an alternative fresh water source) overall is required while cleaning a sewer line. That is, instead of using only clean water to clean the sewer lines, the recycled/reclaimed water may be used again to assist with cleaning the sewer line. As such, the sewer cleaning system 10 is more ecologically friendly as it uses less clean water during the sewer cleaning process. Further, because the water is recycled/reclaimed, the jet-vac truck does not have to leave the job site as frequently to take on additional clean water, resulting in fewer job interruptions, if at all, and therefore, takes less time to complete the sewer cleaning process.

Figure 2:
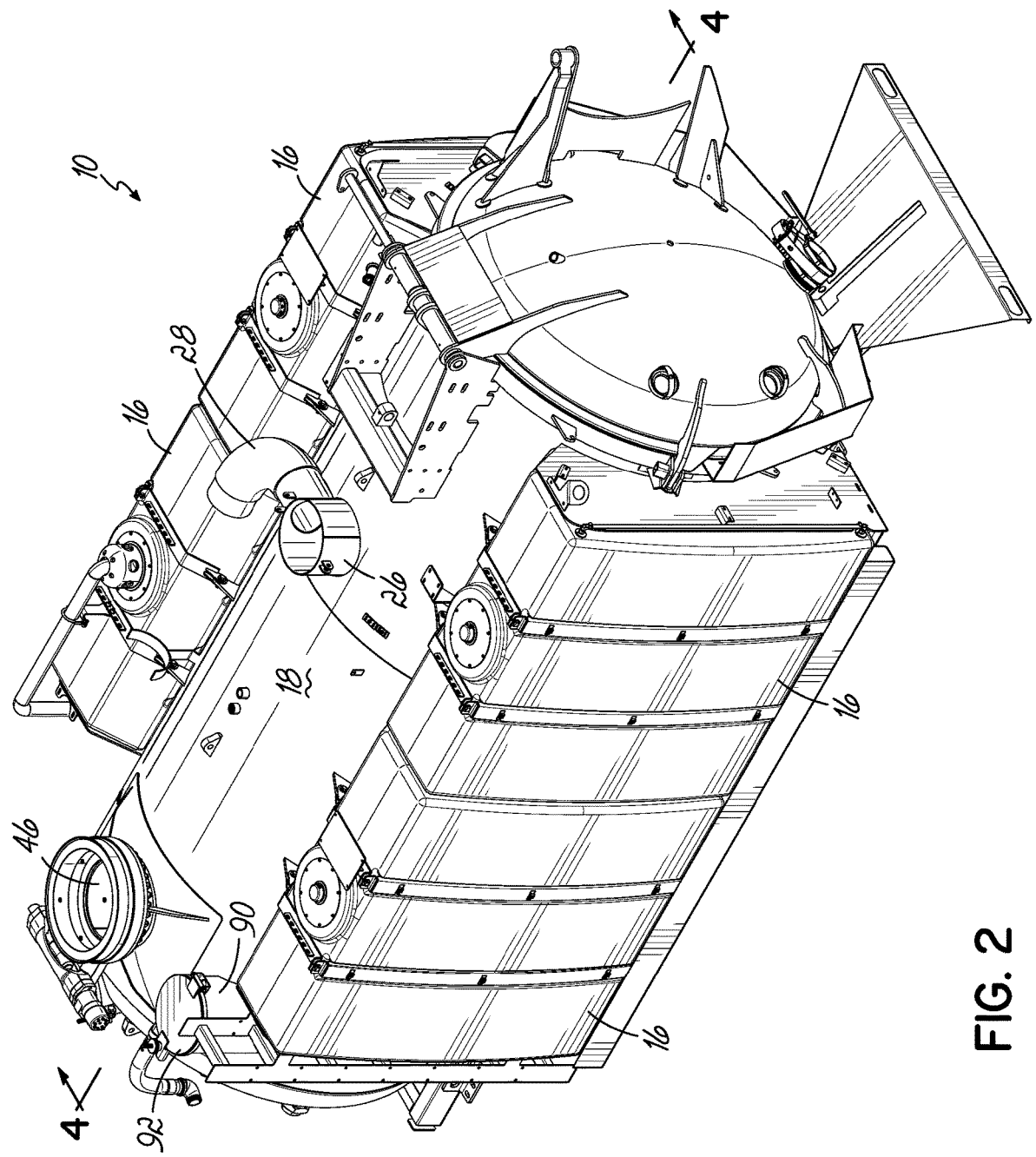
FIG. 2 is a rear perspective view of the sewer cleaning system of FIG. 1 dismounted from the truck and with other features removed for clarity.
Figure 3:
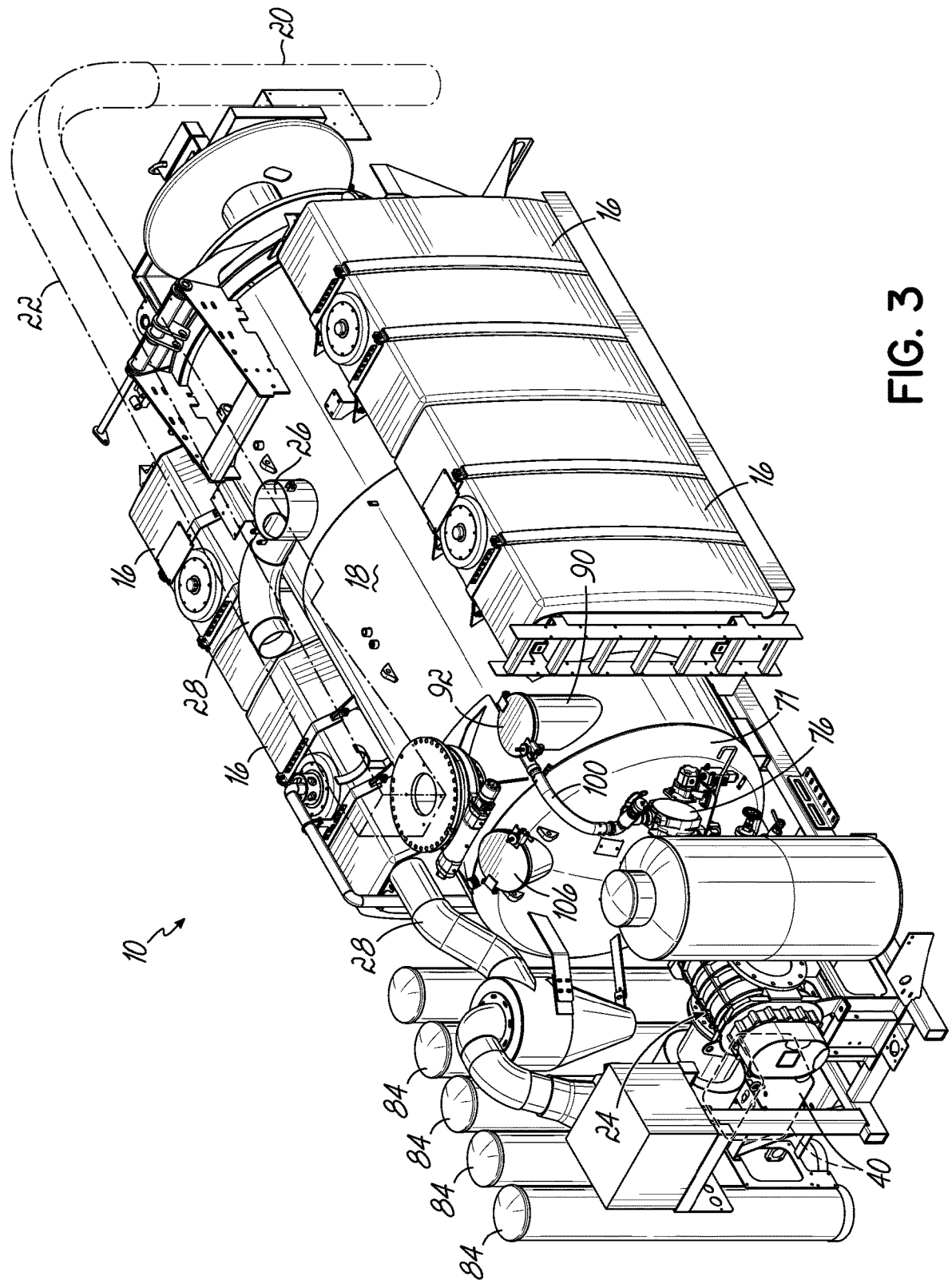
FIG. 3 is front perspective view of the sewer cleaning system of FIG. 1 dismounted from the truck.

With reference to FIGS. 1-3, the sewer cleaning system 10 includes four separate water tanks 16 attached to the outside of a cylindrical debris tank 18 whose longitudinal axis is horizontal and generally parallel to the longitudinal axis of the truck 14. While this particular sewer cleaning system includes four separate water tanks 16, fewer or more water tanks may be used depending on how much water is desired to be transported by the truck 14. A moveable vacuum hose 20 is coupled to the top of the debris tank 18. The vacuum hose 20 is mounted on a boom 22 that is pivotally coupled to the top of the debris tank 18. As such, the vacuum hose 20 may be rotated 360 degrees around the truck 14. To create vacuum in the vacuum hose 20, the sewer cleaning system 10 includes a vacuum-generating system 24 that is connected to an opening 26 in the debris tank 18 via a conduit 28. When operating, the vacuum-generating system 24 draws air from the debris tank 18 to create a negative pressure in the debris tank 18 causing a suction effect in the vacuum hose 20. The length of the vacuum hose 20 may be extended by attaching additional individual hose sections 30, which may be stored behind a cab 32 of the truck 14.

The sewer cleaning system 10 further includes a high-pressure pump 40 operatively coupled to the water tanks 16. The high-pressure pump 40 receives water from the water tanks 16, pressurizes the water, and sends the pressurized water to a water hose 42 mounted on a retractable reel 44 mounted to the back of the debris tank 18. The free end of the water hose 42 includes a water jet nozzle (not shown) that discharges the pressurized water into the sewer line to clear debris in and attached to the sewer line. The water jet nozzle also uses the discharged water to move the detached debris back towards the well/basin at the conjunction of the vertical access shaft and the sewer line.

Figure 4:
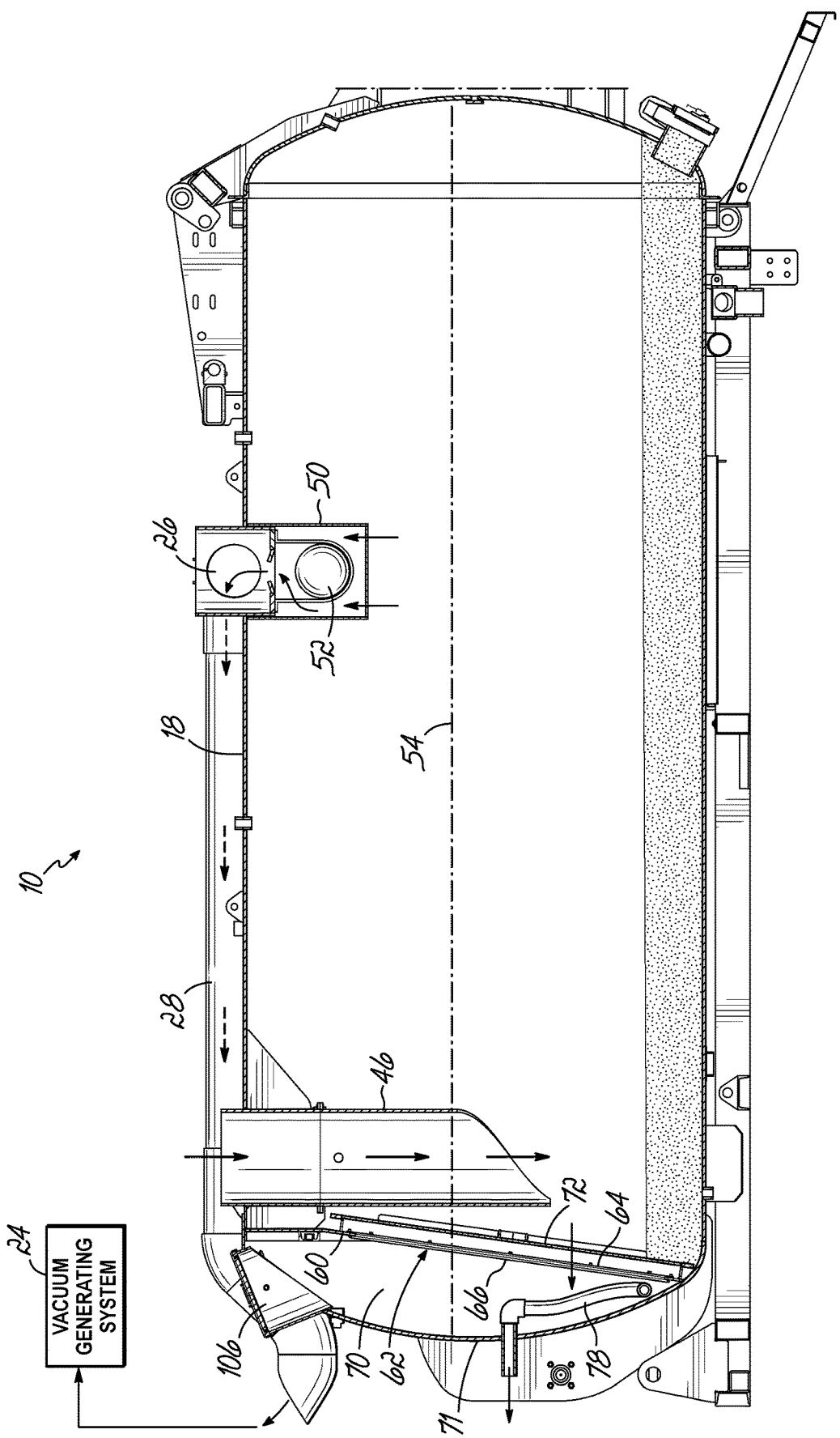
FIG. 4 is a cross-sectional view of the sewer cleaning system of FIG. 2 taken along line 4-4.

The vacuum hose 20 is then used to withdraw the mixture of water and detached debris from the well/basin. The mixture travels through the vacuum hose 20 and is discharged from outlet tube 46 (FIG. 4) inside the debris tank 18. FIG. 4 also depicts the opening 26 in the debris tank 18 which is connected to the vacuum-generating system 24. When operating, the vacuum-generating system 24 draws air from inside the debris tank 18 through the opening 26 thereby generating negative pressure in debris tank 18 which causes suction in the vacuum hose 20. As depicted in FIG. 4, a cage inside the debris tank 18 is coupled to the opening 26. Inside the cage 50 is a suspended spherical float 52. Should the water level (depicted as dashed line 54) rise in the debris tank 18 and contact the spherical float 52, the water will raise the spherical float 52 upwards and, at some point, the spherical float 52 will close the opening 26 so as to stop further air being removed from the debris tank 18. Consequently, with the opening 26 closed there will be no more suction (vacuum) created in the vacuum hose 20 and no additional mixture of water and debris will be pulled into the debris tank 18. When the water level 54 decreases, the spherical float 52 will move downwardly and away from the opening 26 so that air may be removed from the debris tank 18 to create suction (vacuum) in the vacuum hose 20.

With reference to FIGS. 4, 5, and 5A, the front end of the debris tank 18 includes a bulkhead 60 which includes a debris sieve 62. In an embodiment, the debris sieve 62 may have a circular perimeter. The debris sieve 62 includes a first side 64 and a second side 66 with an array of through holes 68 passing from the first side 64 to the second side 66. The through holes 68 are sized to allow water to flow through, but not allow particulate matter of a certain diameter to pass. In an embodiment, the through holes 68 in the debris sieve 62 may have a diameter in the range of 100 microns to 700 microns. The debris tank 18 also includes a fluid chamber 70 defined by the bulkhead 60/debris sieve 62 and a front cap 71 of the debris tank 18. The fluid chamber 70 receives the water passing through the through holes 68 from the first side of the debris sieve 62 to the second side 66. In an embodiment, the debris tank 18 may include a course mesh/grate 72 that is positioned adjacent to the debris sieve 62. The mesh/grate 72 has openings 74 that are much larger than the through holes 68 in the debris sieve 62. The mesh/grate 72 is intended to keep larger debris in the debris tank 18 from contacting and/or clogging the through holes 68 in the debris sieve 62. In that respect, the mesh/grate 72 represents the first filtering device in the reclamation of the water from the mixture of water and debris in the debris tank 18.

An extraction pump 76 (FIG. 3) is mounted to the front of the debris tank 18 and is in fluid communication with the fluid chamber 70 via an extraction pipe 78, one end of which is positioned proximate the bottom of the fluid chamber 70. When the extraction pump 76 is activated, it draws the water inside the fluid chamber 70 through the extraction pipe 78.

In one embodiment, the extraction pump 76 will transfer the extracted water from the fluid chamber 70 into one or more particulate filters 84 (FIG. 3) that are configured to remove additional remaining debris in the water of a certain diameter. If the through holes 68 in the debris sieve 62 have a diameter of 100 microns, it may be possible to eliminate the particulate filters 84. Retaining the particular filters 84, however, adds another layer of filtering of the water to insure no particulate over 100 microns reaches the water tanks 16 and the high-pressure pump 40. Although five particulate filters 84 are depicted in FIG. 3, fewer or more particulate filters 84 may be used in the sewer cleaning system 10. Once the water leaves the one or more particulate filters 84, it returns to the water tanks 16. In an embodiment, the one or more particulate filters 84 remove particulates in the water coming from the fluid chamber 70 greater than or equal to 100 microns. The water with particulates less than 100 microns may pass through the high-pressure pump 40 without causing damage to the high-pressure pump 40. In this configuration, the water passing from the debris tank 18 and through debris sieve 62 and the particulate filters 84 may be continuously passed through the high-pressure pump 40, the water hose 42, the vacuum hose 20, and back into the debris tank 18. Not all water brought to the job site in the water tanks 16 will be recovered by the vacuum hose 20 as it sucks the water and debris mixture from the well/basin. Thus, the filtering and reusing of the water cannot continue indefinitely as a certain percentage of water will be lost during the sewer cleaning process. Nonetheless, the amount of water filtered and reused during the sewer cleaning process will be many times the capacity of the water tanks 16. Consequently, the sewer cleaning system 10 will use far less water than prior systems that could clean the sewer lines only until the water tanks ran out of water. In addition, the sewer cleaning process will be completed faster because the operator does not have to stop during the cleaning process to replenish the water tanks from a remote source of water and/or empty the debris tank 18 as often as in conventional designs. As will be discussed below with respect to FIG. 7, the process of reclaiming and recycling the water in this embodiment may be conducted continuously so long as a sufficient amount of water is being sucked up by the vacuum hose 20 and deposited into the debris tank 18. This process may be considered a continuous operation mode.

Figure 6:
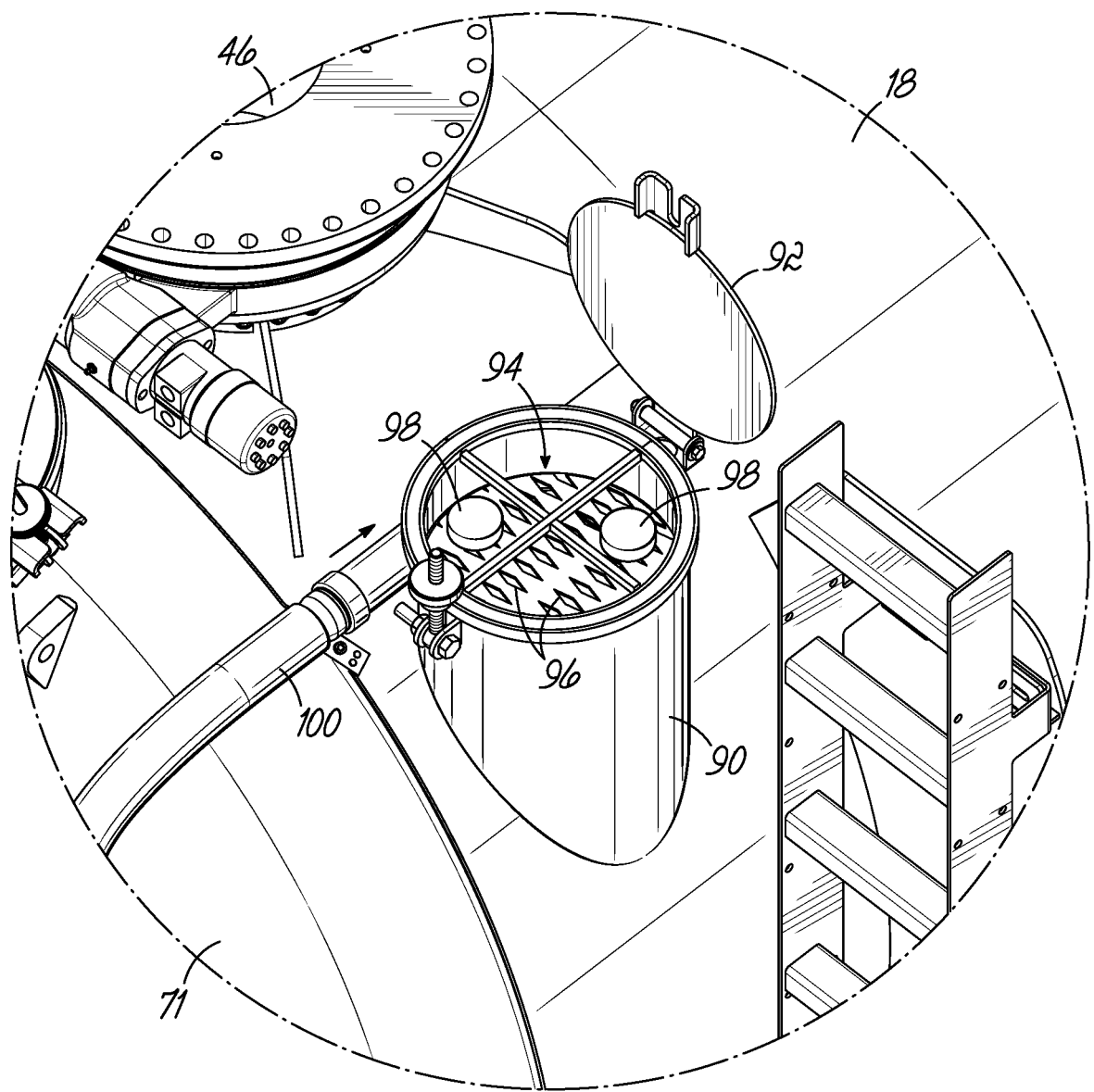
FIG. 6 is an enlarged perspective view of an inlet port of the sewer cleaning system of FIG. 1 having flocculant pucks therein.

In another embodiment, the sewer cleaning system 10 may be operated in a batch mode instead of the continuous operation mode just described above. With reference to FIGS. 3, 4, and 6, the sewer cleaning when the water and debris level in the debris tank 18 reaches a predetermined level, the extraction pump is activated to draw water out of the fluid chamber 70. That water discharged from the extraction pump 76 will not be sent, however, to the particulate filters 84, but will instead be directed to an inlet port 90 which is located in the front of the debris tank 18 and above the extraction pump 76. The inlet port 90 includes a pivotable lid 92 that when opened reveals a support plate 94 (FIG. 6) with a plurality of openings 96 that is configured to hold one or more flocculant pucks 98. The water from the extraction pump 76 enters the inlet port 90 via pipe 100 which is configured to discharge the water onto the flocculant pucks 98 on the support plate 94 causing the flocculant pucks 98 to dissolve and mix with the mixture of water and debris in the debris tank 18. The flocculant material mixes with the debris in the water causing the debris to begin coagulating and falling to the bottom of the debris tank 18. During this process, additional water is drawn out of the fluid chamber 70 by the extraction pump 76 and is directed back into the inlet port 90 and over the flocculant pucks 98. This cycle continues until the flocculant pucks are fully dissolved and the debris is fully coagulated and has largely fallen to the bottom of the debris tank 18. With the debris fully coagulated and the water substantially free of large particulates, the extraction pump 76 may draw the water from the fluid chamber 70 and direct it to the particulate filters 84 and then to the water tanks 16. Using the flocculant pucks 98 to separate the water from the large particulates in the debris tank 18 is considered a batch mode. In this batch mode, the high-pressure pump 40 is shut down and the sewer cleaning is stopped while the flocculant pucks 98 are used to coagulate the large particulates so that the water is separated from the large particulates in the debris tank 18. In the end, the particulates are coagulated and the water is essentially separated from and cleared of the particulates. The cleared water is then run through the particulate filters 84 and put back into the water tanks 16 before the sewer cleaning process resumes. Completing the coagulation process before restarting the sewer cleaning process avoids having a mixture of water and flocculant pass through the particulate filters 84 and the high-pressure pump 40 as the flocculant may gum up the particulate filters 84 and damage the high-pressure pump 40. In this embodiment using the flocculant pucks, the outlet tube 46 preferably extends downwardly approximately one-half the total height of the debris tank 18, and preferably extends downwardly approximately two-thirds the total height of the debris tank 18, of the debris tank 18 so that when the vacuum is operating, the incoming mixture of water and debris from the sewer line is positively directed to the bottom of the debris tank 18. As such, the air entrained in the incoming mixture reduces the specific gravity of the debris in the bottom of debris tank 18, which promotes settling of the flocculated particulates.

The debris tank 18 may further include a back flush port 106 which is located at the front of the debris tank 18 as depicted in FIGS. 3-4. The back flush port 106 opens up to provide access to the fluid chamber 70 and the second side 66 of the debris sieve 62, which faces the fluid chamber 70. After a certain amount of water flows from the debris tank 18 and through the through holes 68 in the debris sieve 62, the through holes 68 in the debris sieve 62 may become partially or fully clogged with debris which will begin to reduce the amount of water that can flow through the debris sieve 62. The back flush port 106 allows for a water hose, for example, to be inserted through the back flush port 106 and into the fluid chamber 70. The water hose can then direct clean, pressurized water into the debris sieve 62 so as to push debris clogging the through holes 68 in the debris sieve 62 back into the debris tank 18. This process may be referred to as back flushing the debris sieve 62. Other automated systems to back flush the debris sieve 62 may be employed. For instance, the fluid chamber 70 may include an array of water jet nozzles (not shown) pointed towards the debris sieve 62. The water jet nozzles may be configured to spray water at the debris sieve 62 automatically based upon a certain amount of time that the extraction pump 76 has run or based on how many gallons of water have passed through the extraction pump 76.

Figure 7:
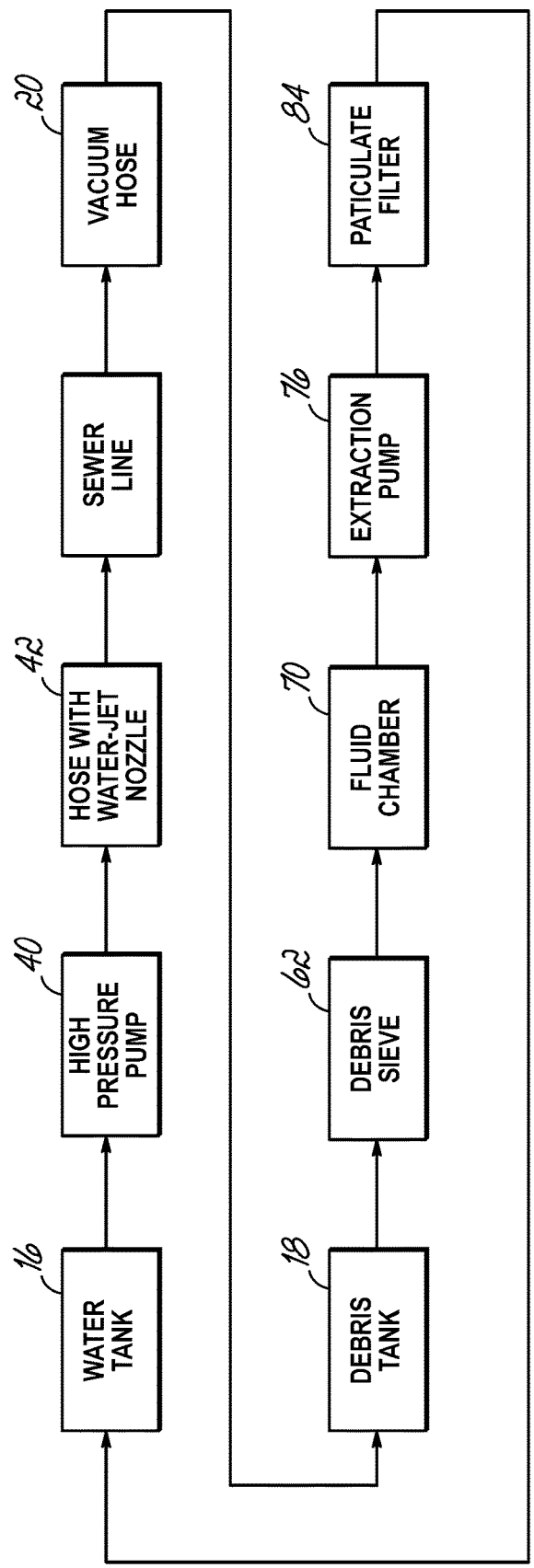
FIG. 7 is a flowchart depicting the cycle by which water circulates through the sewer cleaning system.

A flowchart in FIG. 7 depicts one particular workflow of the sewer cleaning system 10 at a jobsite. The truck 14 with the sewer cleaning system 10 would arrive at the jobsite with the water tanks 16 filled with clean water. The water hose 42 with the water jet nozzle would be placed into the underground sewer line and the high-pressure pump 40 would send high pressure water from the water tanks 16 to the water jet nozzle, which would knock debris from the walls of the sewer line. As the water hose 42 is drawn back, the high pressure water from the water jet nozzle pushes the fallen debris back towards and into the well/basin. The vacuum-generating system 24 may then be activated to cause suction (vacuum) in the vacuum hose 20 so the vacuum hose 20 may suck up the water and debris in the well/basin and deposit it into the debris tank 18 via outlet tube 46. As the debris tank 18 fills up, the water in the debris tank 18 begins to pass through the through holes 68 in the debris sieve 62 into the fluid chamber 70. The extraction pump 76 will then withdraw the water from the fluid chamber 70 via the extraction pipe 78 which directs the water to the particulate filters 84. That filtered water goes back into the water tanks 16 for re-use in the sewer cleaning process. This process of reclaiming and recycling the water may be conducted continuously so long as a sufficient amount of water is being sucked up by the vacuum hose 20 and deposited into the debris tank 18.

Figure 8:
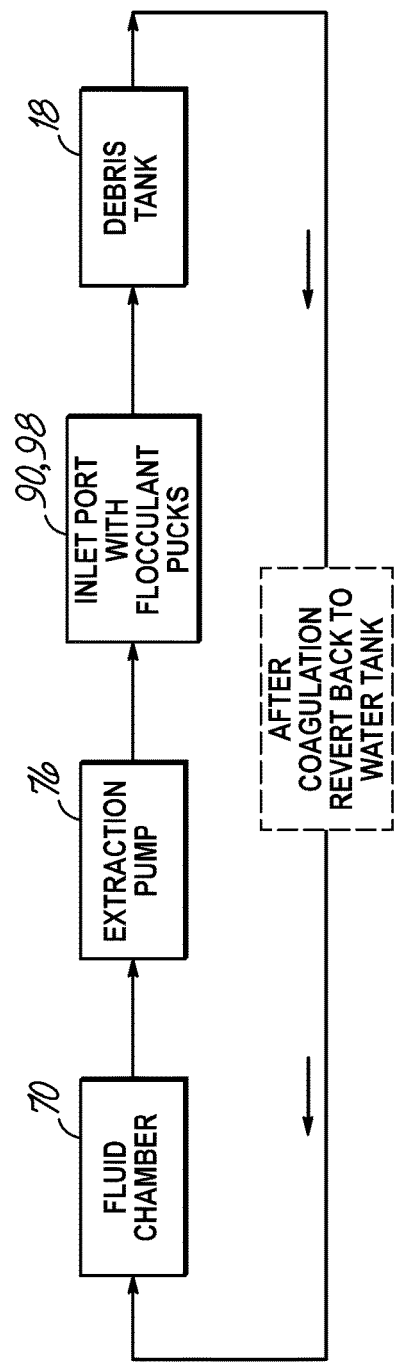
FIG. 8 is a flowchart of an alternate cycle of the water circulating through the sewer cleaning system.

A flowchart in FIG. 8 depicts the sequence when flocculant pucks 98 are used as part of the reclamation and recycling process. As described above, when flocculant pucks 98 are used the water reclamation and recycling process is considered a batch mode. The extraction pump 76 withdraws the water from the fluid chamber 70 and flows it over the flocculant pucks 98, causing them to dissolve. The flocculant material enters the debris tank 18 and then begin to coagulate the particles in the water. As the flocculant pucks 98 are dissolved, more and more of the debris is coagulated. After the coagulation is maximized, the water withdrawn from the fluid chamber 70 is directed to the particular filters 84 and then to the water tanks 16. With all or a vast majority of the water removed from the debris tank 18 and placed in the water tanks 16, the sewer cleaning process may continue until the water in the water tanks 16 is depleted.

The sewer cleaning system 10 is effective in reclaiming, filtering, and recycling water without using any mechanical separation devices, such as centrifuges or vibratory screens, to separate the particulates from the water. As such, the sewer cleaning system 10 is less complicated and less expensive to manufacture, operate, and maintain compared to other systems using mechanical separation devices.

The sewer cleaning system 10 described above and depicted in the drawings is mounted to the truck 14 so that the sewer cleaning system 10 may be readily transported from one job site to another. The sewer cleaning system 10, however, may be mounted to a stationary frame or foundation that is not intended to be moved. In other words, the sewer cleaning system 10 described herein is not limited for use on a truck.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A sewer cleaning system comprising:
    a water tank;
    a pump operatively coupled to the water tank;
    a water hose operatively coupled to the pump;
    a vacuum-generating system;
    a vacuum hose operatively coupled to the vacuum-generating system;
    a debris tank having a bulkhead defining a fluid chamber, the bulkhead including a debris sieve configured to allow water in the debris tank to flow through to the fluid chamber and retain particulates in the debris tank; and
    an extraction pump in fluid communication with the fluid chamber and configured to extract the water in the fluid chamber,
    wherein the extraction pump is in fluid communication with the water tank so as to send the extracted water from the fluid chamber to the water tank, and
    wherein the debris tank includes an inlet port configured to hold flocculant pucks, wherein the extracted water from the fluid chamber may be flowed over the flocculant pucks so that the flocculant pucks dissolve into the debris tank to thereby coagulate particulates in the debris tank.

2. The sewer cleaning system of claim 1, further comprising a truck having a frame, wherein the water tank is operatively mounted to the frame of the truck so that the sewer cleaning system may be transported to different job sites.

3. The sewer cleaning system of claim 1, further comprising a particulate filter operatively coupled to the extraction pump to receive the extracted water from the fluid chamber, the particulate filter configured to further filter additional particulates from the extracted water from the fluid chamber and send the filtered water to the water tank.

4. The sewer cleaning system of claim 1 wherein the debris tank includes a back flush port configured to allow for back flushing the debris sieve with water.

5. The sewer cleaning system of claim 1, wherein the debris sieve includes an array of through holes.

6. The sewer cleaning system of claim 5, wherein each through hole has a diameter in the range of 100 microns to 700 microns.

7. The sewer cleaning system of claim 1, wherein the debris tank includes an outlet tube extending downwardly proximate a bottom half of the debris tank.

8. A method for cleaning a sewer line comprising:
    providing a sewer cleaning system having a water tank and a debris tank;
    discharging high-pressure water into the sewer line to knock debris from the sewer line;
    suctioning a mixture of water and debris out of the sewer line and depositing the mixture of water and debris into the debris tank;
    passing the water in the debris tank through a debris sieve into a fluid chamber to filter out at least some particulates from the water;
    extracting the water from the fluid chamber;
    dispensing the extracted water over at least one flocculant puck so as to return the extracted water back into the debris tank and to dissolve the at least one flocculant puck into the debris tank to thereby coagulate particulates in the debris tank, and
    filling the water tank with the extracted water.

9. The method of claim 8, wherein the sewer cleaning system is mounted to a frame of a truck, and the method further comprises:
    transporting the sewer cleaning system to different job sites with the truck.

10. The method of claim 8, further comprising:
    after extracting the water from the fluid chamber, directing the extracted water through a particulate filter to further remove additional particulates from the extracted water prior to filling the water tank with the extracted water.

11. The method of claim 8, further comprising:
    back flushing the debris sieve to clear the debris sieve of debris or particulates.

12. The method of claim 11, where backflushing the debris sieve further comprises:
    opening a back flush port;
    inserting a hose; and
    spraying fluid from the house onto the debris sieve to clear the debris sieve of debris or particulates.

13. A sewer cleaning system comprising:
    a water tank;
    a pump operatively coupled to the water tank;
    a water hose operatively coupled to the pump;
    a vacuum-generating system;
    a vacuum hose operatively coupled to the vacuum-generating system;
    a debris tank having a bulkhead defining a fluid chamber, the bulkhead including a debris sieve configured to allow water in the debris tank to flow through to the fluid chamber and retain particulates in the debris tank; and
    an extraction pump in fluid communication with the fluid chamber and configured to extract the water in the fluid chamber, and
    a grate with a plurality of openings therein, the grate being disposed adjacent to the debris sieve and configured to prevent larger particulates from contacting the debris sieve, wherein the extraction pump is in fluid communication with the water tank so as to send the extracted water from the fluid chamber to the water tank.

14. The sewer cleaning system of claim 13, further comprising a truck having a frame, wherein the water tank is operatively mounted to the frame of the truck so that the sewer cleaning system may be transported to different job sites.

15. The sewer cleaning system of claim 13, further comprising a particulate filter operatively coupled to the extraction pump to receive the extracted water from the fluid chamber, the particulate filter configured to further filter additional particulates from the extracted water from the fluid chamber and send the filtered water to the water tank.

16. The sewer cleaning system of claim 13 wherein the debris tank includes a back flush port configured to allow for back flushing the debris sieve with water.

17. The sewer cleaning system of claim 13, wherein the debris sieve includes an array of through holes.

18. The sewer cleaning system of claim 17, wherein each through hole has a diameter in the range of 100 microns to 700 microns.

19. The sewer cleaning system of claim 13, wherein the debris tank includes an outlet tube extending downwardly proximate a bottom half of the debris tank.

20. A method for cleaning a sewer line comprising:
providing a sewer cleaning system having a water tank and a debris tank;
discharging high-pressure water into the sewer line to knock debris from the sewer line;
suctioning a mixture of water and debris out of the sewer line and depositing the mixture of water and debris into the debris tank;
passing the water in the debris tank through a grate and then a debris sieve adjacent to the grate and into a fluid chamber to filter out at least some particulates from the water, wherein the grate is configured to prevent large particulates from contacting the debris sieve;
extracting the water from the fluid chamber; and
filling the water tank with the extracted water.

21. The method of claim 20, wherein the sewer cleaning system is mounted to a frame of a truck, and the method further comprises:
transporting the sewer cleaning system to different job sites with the truck.

22. The method of claim 20, further comprising:
after extracting the water from the fluid chamber, directing the extracted water through a particulate filter to further remove additional particulates from the extracted water prior to filling the water tank with the extracted water.

23. The method of claim 20, further comprising:
back flushing the debris sieve to clear the debris sieve of debris or particulates.

24. The method of claim 23, where backflushing the debris sieve further comprises:
opening a back flush port;
inserting a hose; and
spraying fluid from the house onto the debris sieve to clear the debris sieve of debris or particulates.

* * * * *